(12) United States Patent
Yang et al.

(10) Patent No.: US 8,328,153 B2
(45) Date of Patent: Dec. 11, 2012

(54) DISPLAY APPARATUS AND STAND THEREOF

(75) Inventors: Xin Yang, Shenzhen (CN); Wei Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW), `

( * ) Notice: Subject to any disclaimer, the term of this patent is extended or adjusted under 35 U.S.C. 154(b) by 236 days.

(21) Appl. No.: 12/612,663

(22) Filed: Nov. 4, 2009

(65) Prior Publication Data

US 2010/0252710 A1  Oct. 7, 2010

(30) Foreign Application Priority Data

Apr. 1, 2009 (CN) .......................... 2009 1 0301275

(51) Int. Cl.
*F16M 13/00* (2006.01)
(52) U.S. Cl. .......................... 248/370; 248/921; 248/423
(58) Field of Classification Search .............. 248/125.8, 248/158, 161, 407, 159, 371, 423, 454, 456, 248/460, 917–924, 284.1, 296.1, 125.7, 370
See application file for complete search history.

(56) References Cited

U.S. PATENT DOCUMENTS

| 1,180,057 | A | * | 4/1916 | McNamara | 248/456 |
| 1,651,523 | A | * | 12/1927 | Hamlin | 248/454 |
| 3,958,786 | A | * | 5/1976 | Mann | 248/176.3 |
| 4,753,408 | A | * | 6/1988 | Wailes | 248/371 |
| 5,607,135 | A | * | 3/1997 | Yamada | 248/456 |
| 5,810,316 | A | * | 9/1998 | Eby | 248/451 |
| 5,899,421 | A | * | 5/1999 | Silverman | 248/175 |
| 6,000,663 | A | * | 12/1999 | Plasse et al. | 248/27.8 |
| 6,266,566 | B1 | | 7/2001 | Nichols et al. | |
| 6,679,468 | B1 | * | 1/2004 | Hsu | 248/454 |
| 7,011,285 | B2 | * | 3/2006 | Wang et al. | 248/673 |
| 7,059,576 | B2 | * | 6/2006 | Chen et al. | 248/371 |
| 7,104,516 | B2 | * | 9/2006 | Uto et al. | 248/688 |
| 7,178,774 | B2 | * | 2/2007 | Kim | 248/279.1 |
| 7,255,317 | B2 | * | 8/2007 | Huang et al. | 248/371 |
| 7,614,599 | B2 | * | 11/2009 | Moon et al. | 248/454 |
| 2006/0221263 | A1 | * | 10/2006 | Ogawa et al. | 348/794 |
| 2010/0051775 | A1 | * | 3/2010 | Wu et al. | 248/371 |
| 2011/0101193 | A1 | * | 5/2011 | Ye | 248/397 |
| 2011/0108696 | A1 | * | 5/2011 | Ye | 248/371 |

FOREIGN PATENT DOCUMENTS

| CN | 2518153 | 10/2002 |
| CN | 1725065 | 1/2006 |
| JP | 48062164 | 8/1973 |

* cited by examiner

*Primary Examiner* — Terrell McKinnon
*Assistant Examiner* — Steven Marsh
(74) *Attorney, Agent, or Firm* — Altis Law Group, Inc.

(57) ABSTRACT

A display apparatus includes a display body for displaying information and a stand for supporting the display body. The stand includes a base, a first supporting member comprising a first positioning portion adjustable disposed on the base and a first supporting portion connecting with the display body; and a second supporting member comprising a second positioning portion adjustable disposed on the base and a second supporting portion pivotally fixed on the first supporting portion to form a triangle. A distance between the first positioning portion and the second positioning portion is changeable.

20 Claims, 4 Drawing Sheets

DISPLAY APPARATUS AND STAND THEREOF

BACKGROUND

1. Technical Field

The present disclosure relates to display apparatus, and particularly to a display device stand.

2. Description of Related Art

Conventional display apparatus includes a display body for displaying picture and a stand to support the display body. The display body is pivotally supported on the stand. Therefore, a view angle of the display body may be adjusted according to a requirement of a user. However, the height of the display body is typically not be adjusted.

Therefore, it is desirable to provide a display apparatus having a stand which can adjust the height of the display body.

BRIEF DESCRIPTION OF THE DRAWINGS

The components of the drawings are not necessarily drawn to scale, the emphasis instead being placed upon clearly illustrating the principles of the embodiments of an electronic device. Moreover, in the drawings, like reference numerals designate corresponding parts throughout several views.

DETAILED DESCRIPTION

Figure 1:
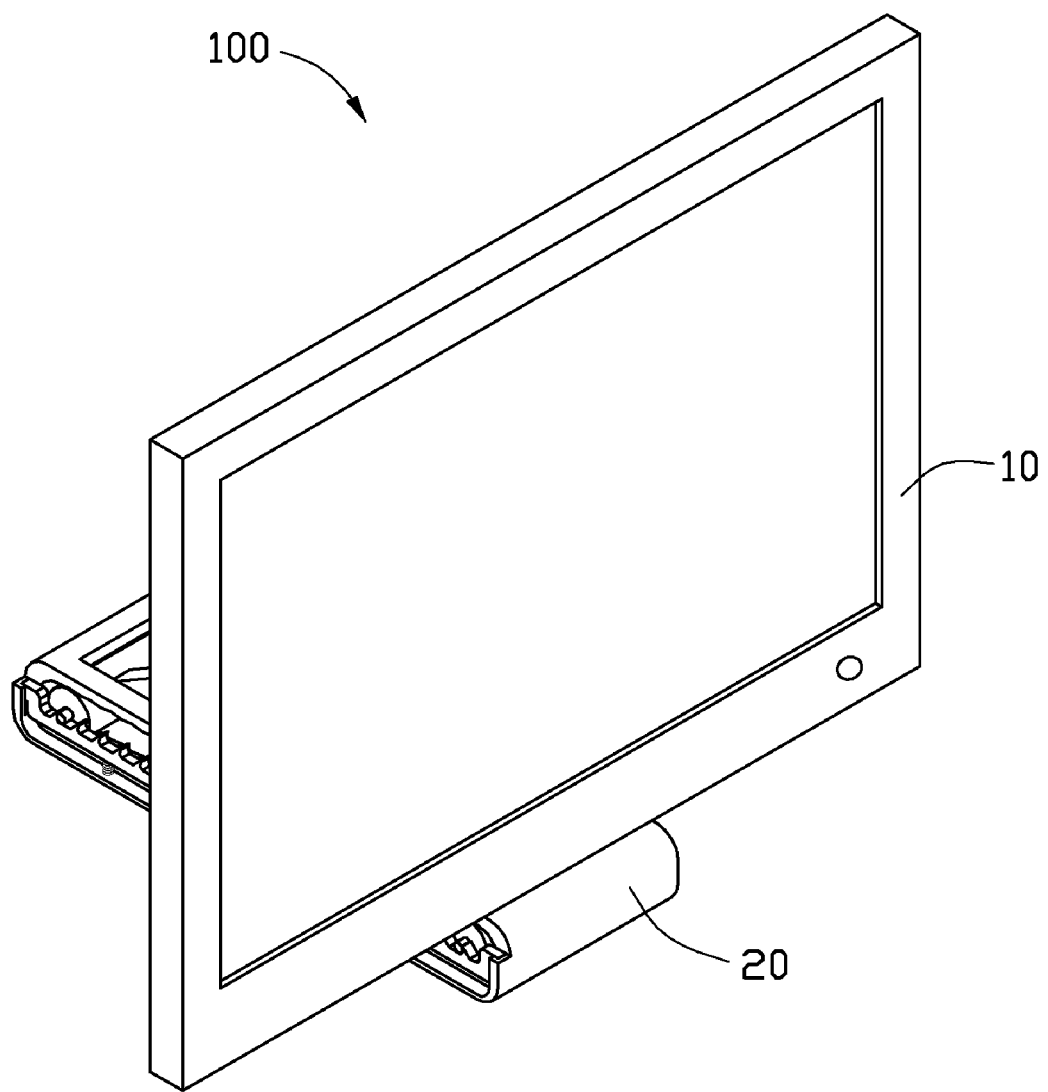
FIG. 1 is an isometric view of a display apparatus according to an exemplary embodiment.

Referring to FIG. 1, a display apparatus 100 according to an exemplary embodiment includes a display body 10 and a foldably adjustable support stand 20. The display body 10 is used for displaying information. The display body 10 is supported on the stand 20, and can rotate with respect to the stand 20 to adjust a viewing angle of the display body 10.

Figure 2:
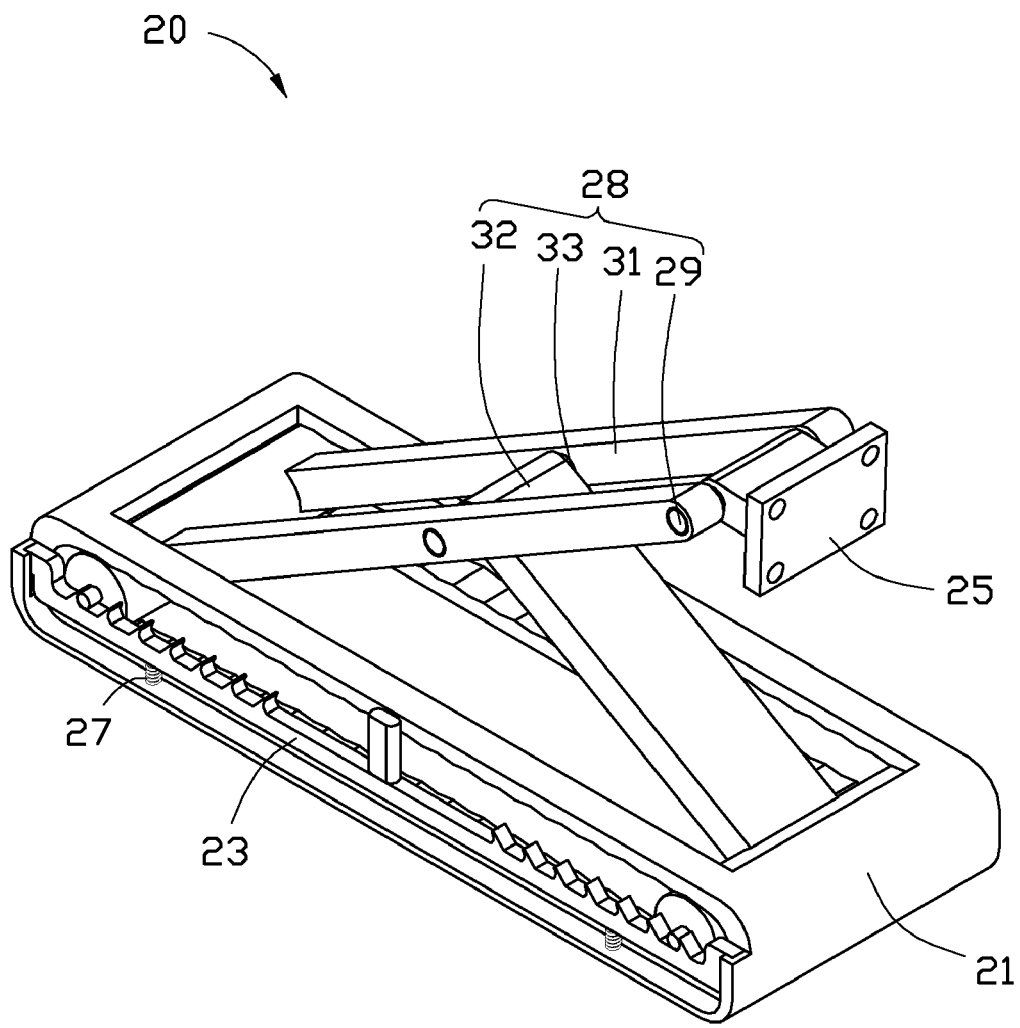
FIG. 2 is an isometric view of a stand of the display apparatus of FIG. 1.
Figure 3:
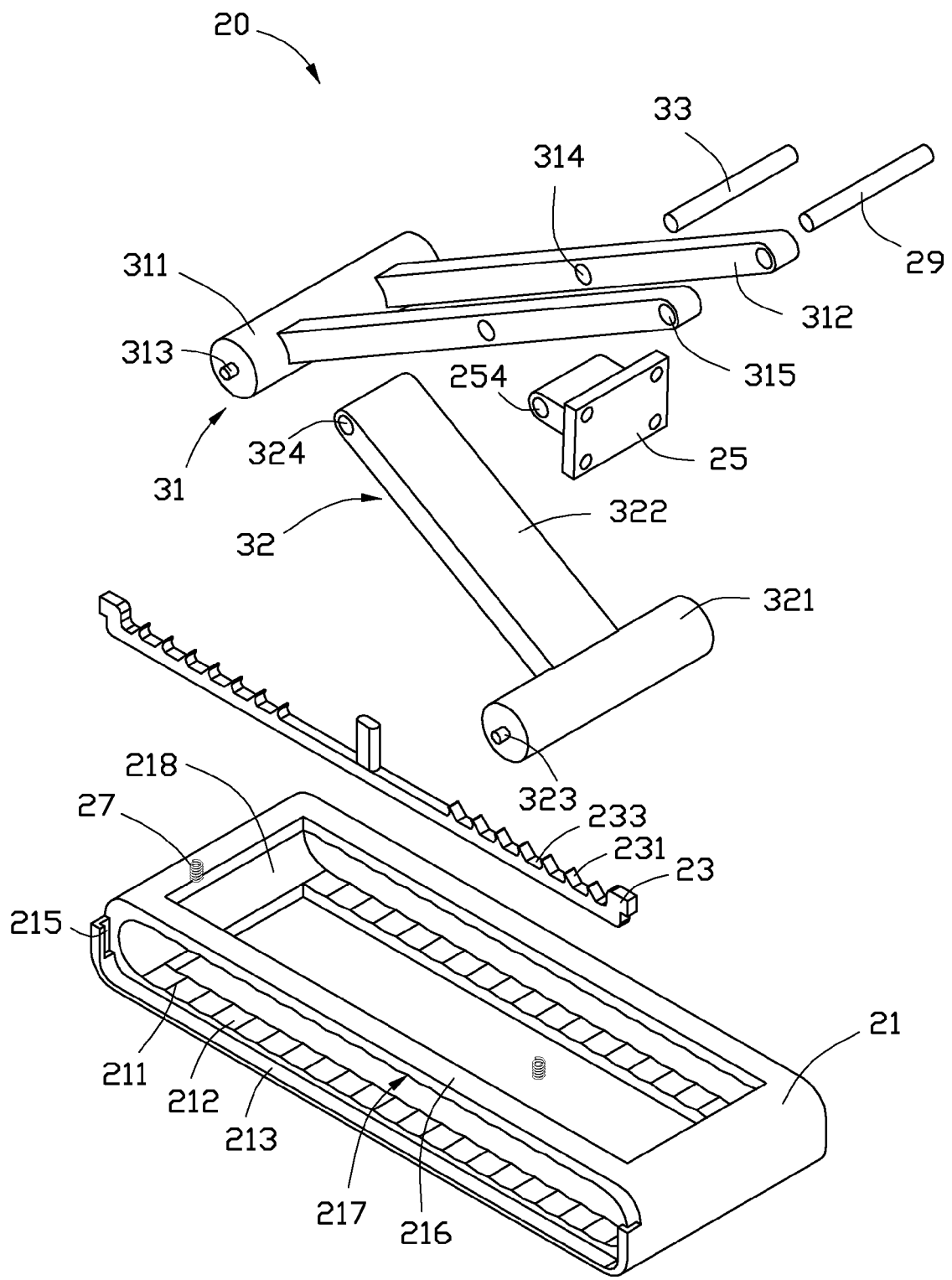
FIG. 3 is an exploded isometric view of the stand of FIG. 2.

Referring to FIGS. 2 and 3, the stand 20 includes a base 21, a limiting member 23, a fixing member 25, two flexible members 27, and a supporting subassembly 28.

The base 21 includes a loading portion 211, a blocking portion 216, and a fixing portion 213. The loading portion 211 and the blocking portion 216 are flat. The loading portion 211 is parallel with the blocking portion 216. Two ends of the loading portion 211 curvedly extend to connect with two ends of the blocking portion 216 correspondingly. The loading portion 211 defines a plurality of positioning grooves 212 facing the blocking portion 216. The plurality of positioning grooves 212 are aligned in a line along a length direction of the loading portion 211.

The blocking portion 216 also defines a plurality of positioning grooves 217 facing the loading portion 211 corresponding to the plurality of positioning grooves 212. An opening 218 is defined in the blocking portion 216.

The fixing portion 213 is elongated, and fixed at one side of the loading portion 211 in the length direction of the loading portion 211. Two ends of the fixing portion 213 along the length direction of the loading portion 211 extend upwardly. Each end of the fixing portion 213 defines a receiving slot 215. The two receiving slots 215 face each other.

The limiting member 23 is elongated-shaped, and disposed on the fixing portion 213 with two ends of the limiting member 23 received in the two receiving slots 215. The limiting member 23 includes a plurality of limiting portions 231. The limiting portions 231 are aligned in an elongating direction of the loading portion 211. The limiting portions 231 are tooth-shaped. A limiting slot 233 is defined between each two of the limiting portions 231. The limiting slots 233 correspond with the positioning grooves 212. In the embodiment, the limiting member 23 is a single piece, in other embodiments, the limiting member 23 may be integrally formed on the base 21.

The two flexible members 27 are disposed between the fixing portion 213 and the limiting member 23, and used for elastically supporting the limiting member 23. In the embodiment, the two flexible members 27 are springs.

The supporting subassembly 28 includes a first supporting member 31, a second supporting member 32, a first shaft 29, and a second shaft 33. The first shaft 29 is used for pivoting the first supporting member 31 and the fixing member 25. The second shaft 33 is used for pivoting the first supporting member 31 and the second supporting member 32.

The first supporting member 31 includes a first positioning portion 311, two parallel first supporting portions 312, and a first locking portion 313. The first positioning portion 311 is cylindrical. The first positioning portion 311 is passed through the opening 218 and disposed between the loading portion 211 and the blocking portion 216. The first portioning portion 311 is adjustably positioned in the positioning grooves 212.

The two first supporting portions 312 are beams perpendicularly connected with the first supporting portion 311. A first through hole 314 is approximately defined in the middle of each first supporting portion 312. A second through hole 315 is defined in the end of each first supporting portion 312 opposite to the first positioning portion 311. In the embodiment, there are two first supporting portions 312, in other embodiments, there may be only one first supporting portion.

The first locking portion 313 is a protrusion disposed at one end of the first positioning portion 311 in the axially direction. The first locking portion 313 is used for selectively being positioned in the limiting slots 233 to prevent the first positioning portion 311 from sliding among the corresponding positioning groove 212.

The second supporting member 32 includes a second positioning portion 321, a second supporting portion 322, and a second locking portion 323. The second positioning portion 321 is cylindrical. The second positioning portion 321 is passed through the opening 218, and disposed between the loading portion 211. The second positioning portion 321 is adjustably positioned in the positioning grooves 212.

The second supporting portion 322 is perpendicularly connected with the second positioning portion 321. A third through hole 324 is defined in the end of the second supporting portion 322 opposite to the second positioning portion 321.

The second locking portion 323 is a protrusion disposed at one end of the second positioning portion 321 in the axially direction. The second locking portion 323 is used for adjustably being positioned in the limiting slots 233 to prevent the second positioning portion 321 from sliding among the positioning grooves 212.

The first shaft 29 is pivotally received in the second through hole 315, and is used for pivotally attaching the fixing member 25 on the two first supporting portions 312. The second shaft 33 is pivotally received in the third through hole 324 and the two first through holes 314 for pivotally attaching the second supporting portion 322 between the two first supporting portions 312.

The fixing member 25 is used for connecting with a display body 10, and is fixed on the back surface of the display body 10 by screws, bolts, and so on. The fixing member 25 defines a fourth through hole 254. The fourth through hole 254 corresponds to the first shaft 29, thus, the first shaft 29 can be passed through the fourth through hole 254, between the two first supporting portions 312.

In assembly, first, two ends of the limiting member 23 are disposed in the receiving slots 215 of the fixing portion 213, and the two flexible members 27 are disposed between the fixing portion 213 and the limiting member 23 to elastically support the limiting member 23. Then, the first positioning portion 311 and the second positioning portion 321 are disposed between the loading portion 211 and the blocking portion 216 through the opening 218, as a result, the first positioning portion 311 and the second positioning portion 321 are received in two different positioning grooves 212 correspondingly. The first locking portion 313 and the second locking portion 323 are held in the corresponding limiting slots 233 between two adjacent limiting portions 231 correspondingly.

After that, the first supporting member 31 and the second supporting member 32 are rotated to coaxially align the third through hole 324 of the second supporting member 32 and the two first through holes 314 of the first supporting member 31, the second shaft 33 is then pivotally inserted into one of the first through holes 314, the third through hole 324, and the other one of the first through holes 314 in successively. Therefore, the second supporting member 32 and the first supporting member 31 are foldably/collapsibly connected together. The loading porting 211, the first supporting member 31, and the second supporting member 32 form a triangle, a length of the bottom edge of which is adjustable.

Finally, the fixing member 25 is fixed at the back surface of display body 10, the first shaft 29 is pivotally inserted into one of the second through holes 315, the fourth through hole 254, and the other one of the second through holes 315. Therefore, the display body 10 is pivoted supported on the stand 20.

Figure 4:
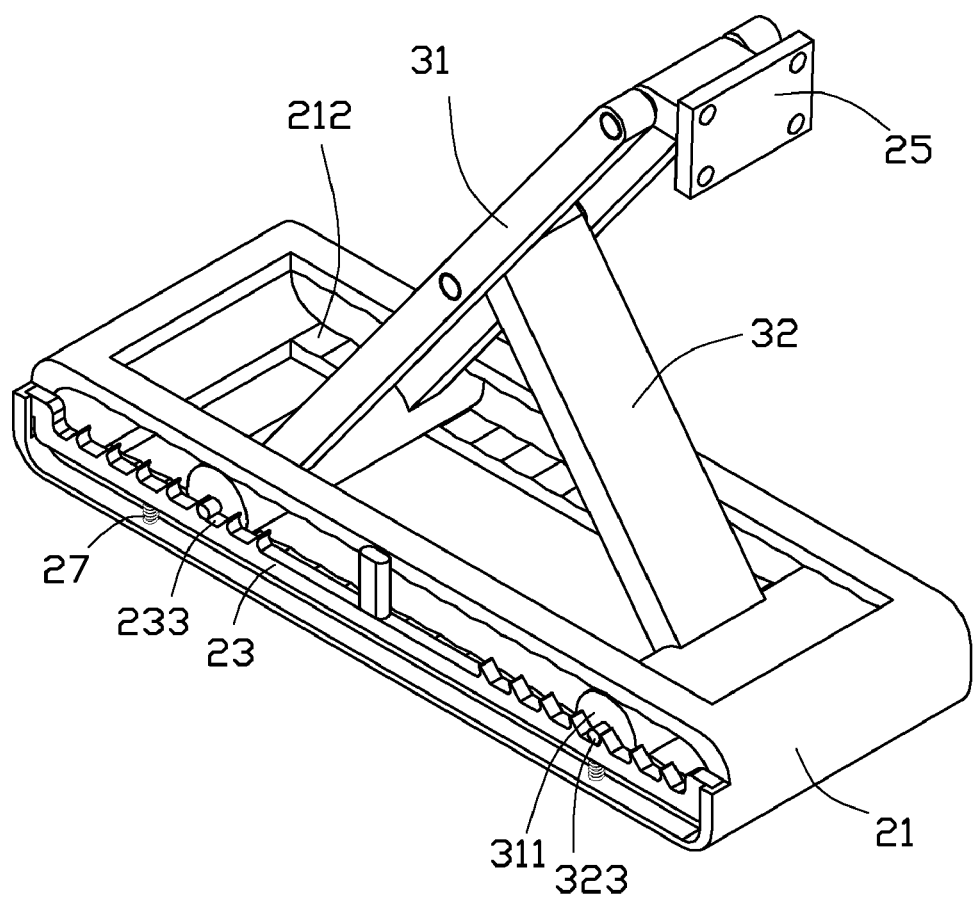
FIG. 4 is an isometric view of the stand of FIG. 2 which has been adjusted.

Further referring to FIG. 4, if the display body 10 is too low, the first positioning portion 311 and the second positioning portion 321 slide in different positioning grooves 212 to shorten a distance between the first positioning portion 311 and the second positioning portion 321, therefore, raising the height of the display body 10. If the display body 10 is too high, the position of the first positioning portion 311 and the second positioning portion 321 in the positioning grooves 212 is adjusted to increase the distance between the first positioning portion 311 and the second positioning portion 321, therefore, lowering the height of the display body 10.

It is to be understood, however, that even though numerous characteristics and advantages of the present disclosure have been set forth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A display apparatus, comprising:
a display body for displaying information; and
a stand for supporting the display body, the stand comprising:
a base comprising:
a loading portion defining a plurality of first positioning grooves; and
a blocking portion parallel with the loading portion, the blocking portion defining an opening;
a first supporting member comprising a first positioning portion adjustably disposed on the base and a first supporting portion connecting with the display body, the first positioning portion is received in one of the plurality of first positioning grooves; and
a second supporting member comprising a second positioning portion adjustably disposed on the base and a second supporting portion pivotally fixed to the first supporting portion to form a triangle, the second positioning portion is received in another one of the plurality of first positioning grooves different from the first positioning portion being received;
wherein the first positioning portion and the second positioning portion are disposed between the blocking portion and the loading portion after passing through the opening;
wherein a distance between the first positioning portion and the second positioning portion is adjustable.

2. The display apparatus of claim 1, wherein the blocking portion defines a plurality of second positioning grooves corresponding to the first positioning grooves for receiving the first positioning portion and the second positioning portion.

3. The display apparatus of claim 1, wherein the base further comprises a fixing portion fixed on the loading portion, the stand further comprises a limiting member disposed on the base, the limiting member defines a plurality of limiting slots, the first supporting member further comprising a first locking portion capable of being received in one of the plurality of limiting slots, the second supporting member further comprising a second locking portion capable of being received in one of the plurality of limiting slots different from the first locking portion.

4. The display apparatus of claim 3, wherein at least one flexible member is disposed between the fixing portion and the limiting member for elastically supporting the limiting member.

5. The display apparatus of claim 1, wherein the base further comprises a fixing portion fixed on the loading portion, the stand further comprises a limiting member disposed on the base, a plurality of limiting portions are arranged on the limiting member in a line, the first supporting member further comprises a first locking portion capable of being locked between two of the plurality of limiting portions, the second supporting member further comprising a second locking portion capable of being locked between two of the plurality of the limiting portions different from the first locking portion.

6. The display apparatus of claim 5, wherein the fixing portion defines two receiving slots for receiving two ends of the limiting member.

7. The display apparatus of claim 5, wherein the plurality of limiting portions are tooth-shaped.

8. The display apparatus comprising:
a display body for displaying information; and
a stand for supporting the display body, the stand comprising:
a base;
a limiting member disposed on the base, the limiting member comprising a plurality of limiting portions, each adjacent two of the limiting portions defining a limiting slot, wherein a plurality of limiting slots is thus formed;
a first supporting member comprising a first positioning portion adjustably disposed on the base, a first locking portion being capable of being received in one of the plurality of limiting slots, and a first supporting portion connecting with the display body;

a second supporting member comprising a second positioning portion adjustably disposed on the base, a second locking portion capable of being received in one of the plurality of limiting slots different from the first locking portion, and a second supporting portion pivotally fixed to the first supporting portion to form a triangle; and at least one flexible member arranged between the limiting member and the base, and to provide an elastic force to the limiting member;

wherein when the limiting member is pressed, the flexible member is compressed, allowing the limiting member to move downwards to a position where the limiting member disengages from the first locking portion and the second locking portion, which allows at least one of the first locking portion and the second locking portion move from a current one of the limiting slots to a different one of the limiting slots before the limiting member is released, thus a distance between the first positioning portion and the second positioning portion is adjustable.

9. The display apparatus of claim 8, wherein the plurality of limiting slots are arranged in a line.

10. The display apparatus of claim 8, wherein each of the limiting portions is tooth-shaped.

11. The display apparatus of claim 8, wherein the second supporting portion is pivotally fixed in a middle of the first supporting portion.

12. A stand used for supporting a display body, the stand comprising:

a base;

a limiting member disposed on the base, the limiting member comprising a plurality of limiting portions, each adjacent two of the limiting portions defining a limiting slot, wherein a plurality of limiting slots is thus formed;

a first supporting member with one end capable of being disposed at a first position of the base and a second end fixed to the display body, the first supporting member comprising a first locking portion being capable of being received in one of the plurality of limiting slots;

a second supporting member with one end capable of being disposed at a second position of the base, the second position being spaced apart from the first position, and a second end of the second supporting member pivotally fixed to the first supporting member for supporting the display body, the second supporting member comprising a second locking portion capable of being received in one of the plurality of limiting slots different from the first locking portion; and at least one flexible member arranged between the limiting member and the base, and to provide an elastic force to the limiting member;

wherein when the limiting member is pressed, the flexible member is compressed, allowing the limiting member to move downwards to a position where the limiting member disengages from the first locking portion and the second locking portion, the second supporting member is capable of being forced to pivot relative to the first supporting member, and the second supporting member is caused to move its one end from the second position to a third position, the third position is located between the first position and the second position, thereby a height of the display body and a distance between the display body and a user are adjusted simultaneously.

13. The stand of claim 12, wherein the first supporting member is capable of being forced to pivot relative to the second supporting member, and the first supporting member is caused to move its one end from the first position to a fourth position, the fourth position is located between the first position and the second position, thereby the height of the display body and a distance between the display body and a user are also adjusted simultaneously.

14. The stand of claim 12, further comprising a fixing member, wherein the second end of the first supporting member is pivotally fixed to the display body by the fixing member.

15. The stand of claim 12, wherein a plurality of limiting portions arranged in a line are disposed on the base, a part of the first supporting member is disposed between two of the plurality of limiting portions, a part of the second supporting member is disposed between two of the plurality of limiting portions different from the first supporting member.

16. The stand of claim 12, wherein the base comprises a loading portion defining a plurality of first positioning grooves, the first locking portion is received in one of the plurality of first positioning grooves, and the second locking portion is received in another one of the plurality of first positioning grooves different from the first locking portion being received.

17. The stand of claim 16, wherein the base further comprises a blocking portion parallel with the loading portion, the blocking portion defines an opening, and the first locking portion and the second locking portion are disposed between the blocking portion and the loading portion after passing through the opening.

18. The stand of claim 17, wherein the blocking portion defines a plurality of second positioning grooves corresponding to the first positioning grooves for receiving the first locking portion and the second locking portion.

19. The stand of claim 16, wherein the base further comprises a fixing portion fixed on the loading portion, the limiting member is disposed on the fixing portion, and the at least one flexible member is disposed between the fixing portion and the limiting member for elastically supporting the limiting member.

20. The stand of claim 19, wherein the fixing defines two receiving slots for receiving two ends of the limiting member.

* * * * *